United States Patent
Moffett et al.

(10) Patent No.: US 9,977,510 B1
(45) Date of Patent: May 22, 2018

(54) GESTURE-DRIVEN INTRODUCTION SYSTEM

(71) Applicants: Wayne A. Moffett, Lake Worth, FL (US); William C. Moffett, Lake Worth, FL (US); Willow C. Moffett, Lake Worth, FL (US)

(72) Inventors: Wayne A. Moffett, Lake Worth, FL (US); William C. Moffett, Lake Worth, FL (US); Willow C. Moffett, Lake Worth, FL (US)

( * ) Notice: Subject to any disclaimer, the term of this patent is extended or adjusted under 35 U.S.C. 154(b) by 64 days.

(21) Appl. No.: 15/274,625

(22) Filed: Sep. 23, 2016

Related U.S. Application Data

(60) Provisional application No. 62/398,855, filed on Sep. 23, 2016.

(51) Int. Cl.
*G09G 5/00* (2006.01)
*G06F 3/01* (2006.01)
*G06F 3/0346* (2013.01)
*H04W 4/02* (2018.01)

(52) U.S. Cl.
CPC ............ *G06F 3/017* (2013.01); *G06F 3/0346* (2013.01); *H04W 4/023* (2013.01)

(58) Field of Classification Search
CPC ........ G06F 3/011; G06F 3/017; G06F 3/0346; G06F 3/038
See application file for complete search history.

(56) References Cited

U.S. PATENT DOCUMENTS

| | | | | |
|---|---|---|---|---|
| 2006/0284791 A1* | 12/2006 | Chen | ........................ | G06F 3/011 345/8 |
| 2011/0179387 A1* | 7/2011 | Shaffer | ............... | G06F 3/04883 715/835 |
| 2014/0139454 A1* | 5/2014 | Mistry | ..................... | G06F 3/041 345/173 |
| 2014/0365979 A1* | 12/2014 | Yoon | ........................ | G06F 3/017 715/863 |
| 2015/0026647 A1* | 1/2015 | Park | ........................ | G06F 3/0488 715/863 |
| 2015/0178955 A1* | 6/2015 | Topakas | ............ | G06F 17/30247 345/589 |

(Continued)

*Primary Examiner* — Joe H Cheng
(74) *Attorney, Agent, or Firm* — Patents on Demand P.A.; Brian K. Buchheit

(57) ABSTRACT

An introduction method can begin with gesture event data being received by a client application of a gesture-driven introduction system running on a user device of a first human actor. The gesture event data can comprise a gesture and ancillary conditions regarding performance of the gesture by a second human actor. The first human actor and the second human actor can be registered members of the gesture-driven introduction system. The received gesture event data can be assessed with respect to introduction definitions created by the first human actor. An introduction definition can define triggering parameters for exchanging predetermined introduction data. When the gesture event data satisfies the triggering parameters expressed in an introduction definition, the predetermined introduction data can be automatically transmitted to a user device of the second human actor. The transmission can occur without direct physical or verbal interaction between the first and second human actors.

20 Claims, 7 Drawing Sheets

(56) References Cited

U.S. PATENT DOCUMENTS

| | | | | |
|---|---|---|---|---|
| 2015/0348327 A1* | 12/2015 | Zalewski | ............... | G06F 3/01 345/419 |
| 2016/0124579 A1* | 5/2016 | Tokutake | ............. | G06F 3/0481 345/156 |
| 2017/0038847 A1* | 2/2017 | Schorsch | ............... | G06F 3/017 |
| 2017/0109121 A1* | 4/2017 | Tsubone | ............... | G06F 3/0412 |
| 2017/0303156 A1* | 10/2017 | Kimura | ............... | H04W 24/10 |

\* cited by examiner

Example 400

Example 435

GESTURE-DRIVEN INTRODUCTION SYSTEM

CROSS-REFERENCE TO RELATED APPLICATIONS

This utility application claims the benefit of U.S. Provisional Patent 62/398,855 filed on Sep. 23, 2016, entitled "SYSTEM AND METHOD FOR PROXIMITY INTRODUCTIONS." The entire contents of 62/398,855 are incorporated by reference herein in their entirety.

BACKGROUND

The present invention relates to the field of data exchange systems and, more particularly, to a gesture-driven introduction system.

Relationships rely upon a variety of means of introducing one's self to another person or group of persons; the fundamental principle of social networking, whether performed physically (in-person) or within an electronic system (online). Often, the introduction starts with a simple gesture—an email, a hand wave, or a nod of the head, followed by some discourse to determine a sense of compatibility, and, when compatible, personal information is exchanged to continue the establishment of the relationship.

Regardless of the format (in-person or online), introducing one's self is a daunting and anxiety-inducing task for many people. Fear of rejection, social awkwardness, and other psychological reservations factor into a person's ability to successfully introduce themselves to new people.

During the introduction, the determination of compatibility also acts as an assessment of trust in the other person with respect to data privacy and security; does this person appear to be trustworthy enough to handle personal information? One wants to be sure that any exchanged personal information will be kept secure and used appropriately.

What is needed is a solution that facilitates the exchange of personal information that occurs between people during an introduction. Such a solution would reduce anxiety-causing factors and streamline the introduction process.

BRIEF SUMMARY

One aspect of the present invention can include a method that begins with gesture event data being received by a client application of a gesture-driven introduction system running on a user device of a first human actor. The gesture event data can comprise a gesture and ancillary conditions regarding performance of the gesture by a second human actor. The gesture can be representative of a discrete non-empty set of deliberate motions whose execution utilizes at least one visible and movable body part of the second human actor. The first human actor and the second human actor can be registered members of the gesture-driven introduction system. The received gesture event data can be assessed with respect to introduction definitions created by the first human actor. An introduction definition can define triggering parameters for exchanging predetermined introduction data. The triggering parameters can comprise one or more gestures and one or more ancillary conditions. When the gesture event data is assessed as satisfying the triggering parameters expressed in an introduction definition, the predetermined introduction data of the respective introduction definition can be automatically transmitted to a user device of the second human actor. The transmission can occur without direct physical or verbal interaction between the first and second human actors.

Another aspect of the present invention can include a method that begins with the registering of a portable user device of a first human actor and a portable user device of a second human actor with a location monitoring component of a gesture-driven introduction system using a communications network. The first human actor and the second human actor can be members of the gesture-driven introduction system. The registration can notify the location monitoring component of the current location of each user device. A notification indicating that the current location of each user device is within a predefined proximity of each other can be received by the user devices of the first and second human actors. The notification can be made via a client application running on their respective user devices and can specify one or more gestures to perform to exchange introduction data. The gesture can be representative of a discrete non-empty set of deliberate motions whose execution utilizes at least one visible and movable body part. When the first and second human actors each perform a gesture specified in the notification, gesture event data can be generated by each user device for their respective human actor. The gesture event data can comprise the gesture and one or more ancillary conditions regarding performance of the gesture. The generated gesture event data can be exchanged between the user devices via the communications network. The exchanged gesture event data can be assessed by each user device with respect to their introduction definitions. An introduction definition can be a user-created data structure that defines triggering parameters for exchanging introduction data. The triggering parameters can comprise one or more gestures and one or more ancillary conditions. When the gesture event data is assessed as satisfying the triggering parameters expressed in an introduction definition, automatically exchanging the introduction data associated with the respective introduction definition between the user devices of the first and second human actors via the communications network. The exchange can occur without direct physical or verbal interaction between the first and second human actors.

Yet another aspect of the present invention can include a gesture-driven introduction system comprised of gestures, introduction definitions, a means for capturing gesture event data, a means for determining satisfaction of an introduction definition by gesture event data, and a means for exchanging introduction data. The gestures can be defined within a gesture-driven introduction system. Each gesture can represent a discrete non-empty set of deliberate motions whose execution utilizes at least one visible and movable body part of a human actor. The introduction definitions can be user-created and can define triggering parameters for exchanging introduction data. The gesture event data can be captured by its means when a human actor performs one of the gestures. The gesture event data can comprise the gesture and one or more ancillary conditions regarding performance of the gesture. Introduction data can be exchanged by the means over a communications network between user devices of two or more members of the gesture-driven introduction system responsive to satisfaction of an introduction definition by the gesture event data.

DETAILED DESCRIPTION

Figure 1:
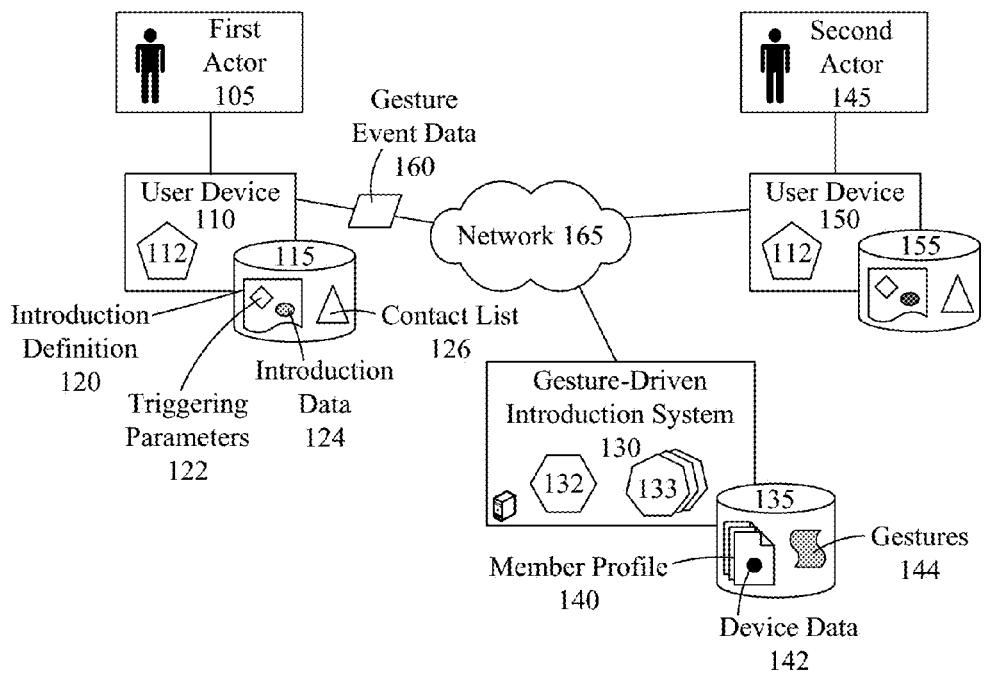
FIG. 1 is a block diagram of a system for utilizing a gesture-driven introduction system in accordance with embodiments of the inventive arrangements disclosed herein.

The present invention discloses a solution for exchanging data between members of a gesture-driven introduction system without direct interaction. The gesture-driven introduction system can utilize defined gestures as the primary trigger for exchanging introduction data. Members can define introduction definitions to indicate triggering parameters and the introduction data they wish to exchange. Performance of a gesture can be captured as gesture event data by the appropriate elements of a user device or another device of the gesture-driven introduction system. When the gesture event data matches the triggering parameters of an introduction definition, the introduction data of the two members can be exchanged.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of a system 100 for utilizing a gesture-driven introduction system 130 in accordance with embodiments of the inventive arrangements disclosed herein. In system 100, the gesture-driven introduction system 130, herein referred to as the introduction system 130, can be used to automatically exchange introduction data 124 between the user devices 110 and 150 of two human agents referred to as the first actor 105 and the second actor 145 based upon a performed gesture 144.

The introduction system 130 can represent the hardware and/or software required to exchange the introduction data 124 over one or more networks 165 between the user devices 110 and 150 of two actors 105 and 145. The embodiment of the introduction system 130 shown in system 100 can utilize a client-server architecture that includes a client application 112, a server application 132, gesture capture components 133, and a data store 135 for storing member profiles 140 and gesture 144 data. Other contemplated embodiments of the introduction system 130 can utilize different architectures (e.g., a service-oriented architecture (SOA)) and/or include additional components to support, expand, and/or enhance functionality.

As used herein, the terms "actors" and "members" can be used interchangeably to refer to users of the introduction system 130. That is, in these discussions, an actor 105 and 145 must be a member of the introduction system 130.

The client application 112 can be a software component of the introduction system 130 that runs on an actor's 105 and 145 user device 110 and 150. The client application 112 can utilize the inherent components of the user device 110 and 150 to perform its functions. These functions can vary based upon the specific embodiment and/or implementation of the introduction system 130.

A user device 110 and 150 can represent a variety of computing devices capable of supporting the functionality of the client application 112 and communicating of a network 165. The user device 110 and 150 can be portable like a smartphone or wearable like a smart watch. The user device 110 and 150 can be an existing device that the client application 112 is added to like an app downloaded to a tablet computer or a device proprietary to the introduction system 130, such as a specialized glove.

Figure 1A:
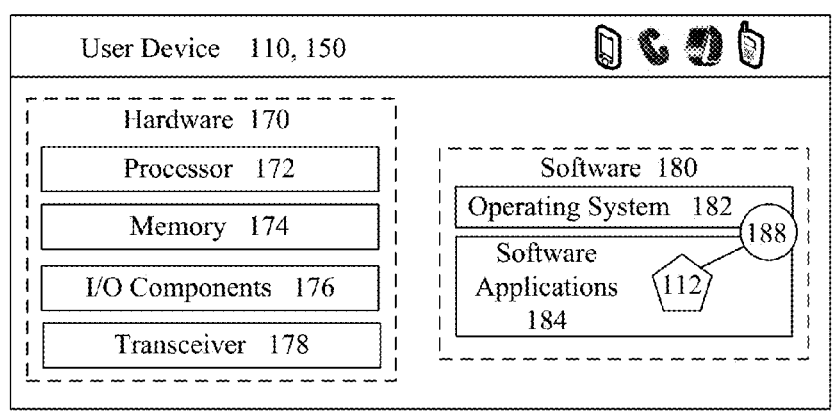
FIG. 1A is a block diagram of a user device for use with the gesture-driven introduction system in accordance with embodiments of the inventive arrangements disclosed herein.

Other specific elements of an example user device 110 and 150 can be shown in FIG. 1A. The user device 110 and 150 can be comprised of various hardware 170 and software 180 components. The hardware 170 can include a processor 172, memory 174, input/output (I/O) components 176, a transceiver 178, and the like.

The processor 172 can refer to a central processor unit (CPU) that executes the machine-readable instructions of software 180 by performing arithmetical, logical, and input/output operations. The memory 174 can store the machine-readable instructions during execution as well as intermediary data. Memory 174 can include volatile and non-volatile elements.

The I/O components 176 can represent a variety of means of receiving input data and presenting output data. Examples of I/O components 176 can include, but are not limited to, a microphone, a speaker, a display, a keyboard, a touchscreen, orientation sensors, motion sensors, and the like. Some I/O components 176 can require supporting software applications 184 to process raw input data. For example, a video processing software application 184 can be required to identify people in a video.

The client application 112 can be written using an appropriate programming language and/or application programming interface (API) to utilize the I/O components 176 of the user device 110 and 150. This can allow the client application 112 to directly interact with the actors 105 and 145 via a user interface or to access data captured by the I/O components 176 or other data-related components like a GPS module.

In another contemplated embodiment, the I/O components 176 of the user device 110 and 150 can be utilized to capture the gesture event data 160 when a gesture 144 is performed. For example, the first actor 105 can use the camera 176 of their smartphone 110 to capture video of the second actor 145 waving at them.

The transceiver 178 can be a component able to transmit and receive data over a network 165. The transceiver 178 can be a wired or a wireless transceiver. Multiple transceivers 178 can be included in the user device 110 and 150 to allow multiple means of connectivity. In such an embodiment, the user device 110 and 150 and/or client application 112 can be configured to select and utilize a network 165 in accordance with predefined rules and/or user-configured preferences.

The software 180 components of the user device 110 and 150 can represent the machine-readable instructions that are stored in the data store 115 and cause the user device 110 and 150 to perform various tasks when executed by the processor 172. The primary software 180 components can include the operating system 182 and software applications 184.

The operating system 182 can represent the system program that manages the resources, hardware 170 and software 180, of the user device 110 and 150 and provides common services for software applications 184. A software application 184 can be a computer program representing a group of related functions that allow a user (i.e., actors 105 and 145) to perform a specific task. The client application 112 can be a software application 184 installed on the user device 110 and 150.

Additionally, the client application 112 can utilize a specialized software application 184 called a listener agent 188. The listener agent 188 can be a computer program that is run by the operating system 182 even when the client application 112 is not active. The listener agent 188 can await communication from the introduction system 130 and activate the client application 112 and/or or functions when necessary.

The user device 110 and 150 can also include a data store 115 and 155 for storing information used by the introduction system 130, such as introduction definitions 120 and a contact list 126. In another embodiment, the introduction definitions 120 and/or contact list 126 can be stored in the data store 135 of the introduction system 130.

The contact list 126 can be a listing of other members of the introduction system 130 that the actor 105 and 145 has exchanged introduction data 124. When introduction data 124 is exchanged between actors 105 and 145, a new entry can be created in each actor's 105 and 145 contact list 126.

An introduction definition 120 can represent the means by which an actor 105 and 145 controls exchanging introduction data 124. The introduction definition 120 can be comprised of triggering parameters 122 and introduction data 124. In another embodiment, the introduction definitions 120 can be stored by the introduction system 130, remote from the user device 110 and 150.

The triggering parameters 122 can represent the conditions that must be met for a data exchange to occur. The inclusion of at least one gesture 144 in the triggering parameters 122 can be required. A gesture 144 can be a set of deliberate motions whose execution utilizes one or more visible and movable body parts of an actor 105 and 145. Examples of a gesture 144 can include, but are not limited to, the waving of a hand, the winking of an eye, the clapping of hands, standing from a sitting position, the raising of one or both arms/hands, the nodding of the head, blowing a kiss, the tapping of a nose with a finger, and the like.

Ancillary conditions can also be specified in the triggering parameters 122 to further restrict when or with whom introduction data 124 is exchanged. Examples of an ancillary condition can include, but are not limited to, a time, a date, a location, a data value (i.e., personal information, physical trait, personality trait) provided to the introduction system 130 by the actor 105 and 145, the proximity between the actors 105 and 145, and the like.

The values specified for triggering parameters 122 can be compared to gesture event data 160 to determine if a data exchange should occur. Gesture event data 160 can be data about the performance of a gesture 144. The gesture event data 160 can mirror the type of data expressed in the triggering parameters 122—a gesture 144 and ancillary condition data. Therefore, ancillary conditions used by the introduction system 130 can be commensurate with the devices and/or components being used to capture the gesture event data 160.

For example, when the second actor 145 waves 144 at the first actor 105, the introduction system 130 can generate gesture event data 160 that indicates that a wave 144 was performed at this specific time, date, and location.

The introduction data 124 can be personal and/or contact information that an actor 145 wishes to exchange with another actor 105 and an actor 105 wishes to exchange with another actor 145. The introduction data 124 can be specified, directly or referenced, in the introduction definition 120.

For example, an actor 105 and 145 can provide various personal information like their name and email address in their member profile 140. The introduction data 124 can be a list of the pieces of personal information; instead of the actor 105 and 145 re-entering the same information into different introduction definitions 120.

An actor 105 and 145 can utilize multiple introduction definitions 120 to account for different personal information that they would like to exchange with different groups of people. For example, an actor 105 and 145 can have an introduction definition 120 for business people and a different introduction definition 120 for online game players. This can allow the actor 105 and 145 to tailor the introduction data 124 that they exchange with businesspeople (e.g., name, company, position, work telephone number, etc.) and online game players (e.g., game name, handle, server, etc.). Triggering parameters 122 can focus on personal information that would identify and actor 105 and 145 as a businessperson or an online game player, such as through the use of data values that indicate occupation and hobby.

The server application 132 of the introduction system 130 can be a software program that runs on a server that has access to the data store 135 housing member profiles 140 and gesture 144 data. The server application 132 can interface with the client application 112, the gesture capture components 133, member profiles 140, and/or gesture 144 data to handle gesture 144 related tasks, such as identifying the performance of a gesture 144, registering actors 105 and 145 and/or their user devices 110 and 150, and the like. The functionality of the server application 132 can vary based upon the requirements of the specific implementation and/or embodiment.

The gesture capture components 133 can represent a variety of means for capturing the gesture event data 160. The gesture capture components 133 can vary depending on the type of data being captured, the specific implementation of the introduction system 130, as well as the environment in which the introduction system 130 is being used.

For example, in a conference setting, multiple digital cameras 133 can be positioned within a conference room to capture video of the attendees 105 and 145. The server application 132 can process the captured video to determine if any of the defined gestures 144 are performed. This would allow the attendees 105 and 145 to exchange introduction data 124 without interrupting the conference or trying to meet afterwards.

In another embodiment, the gesture capture components 133 can be one or more of the I/O components 176 of the user device 110 and 150.

In yet another embodiment, the gesture capture components 133 can be elements of an existing data capture system that the introduction system 130 has been allowed access, such as the video or audio feeds of an existing security system. In one embodiment, the gesture capture components 144 utilize at least one component of an electronic device accessible by the gesture-driven introduction system 130 and separate from the user devices 110 and/or 150) of members (first actor 105 and/or second actor 145) of the gesture-driven introduction system 130. The component(s) include one of an accelerometer, a gyroscope, a rotational vector sensor, a gravity sensor, a photometer, an orientation sensor, a magnetometer, and a digital video camera. The component(s) include supporting software.

Each actor 105 and 145 and their respective user device 110 and 150 can be registered with the introduction system 130, generating a member profile 140 with device data 142. The member profile 140 can be used to store a variety of personal information about the actor 105 and 145 as well as preferences that influence operation of the introduction system 130. The device data 142 can store identifying information about a specific user device 110 or 150, authorizing that user device 110 and 150 to interact with the introduction system 130.

For example, the member profile 140 can store the name, address, and phone number of the first actor 105 and indicate their preference that any unsecured local wireless networks 165 should be used before their cellular data network 165.

The gestures 144 can be defined and stored by the introduction system 130. The definition of the gestures 144 can vary by the specific embodiment of the introduction system 130; definitions should be commensurate with the gesture capture components 133.

In a simple embodiment, gestures 144 can be expressed as positions and/or the changes in position or motion of body parts. A more robust embodiment can expand upon the basic biomechanical positioning and/or movement by capturing a reference of each gesture 144 from each actor 105 and 145, similar to the motion-capture functionality of the XBOX KINECT. For example, a generic biomechanical model can be used as the basis for a hand-waving gesture 144 and a video capture can precisely define a member's performance of the hand-waving gesture 144.

In another contemplated embodiment, the introduction system 130 can be configured to interface with a social media system. In such an embodiment, the member profile 140 and/or introduction data 124 can be extracted from the social media system.

In yet another embodiment, the introduction system 130 can utilize a location monitoring service to determine when the user devices 110 and 150 of the actors 105 and 145 are within proximity of each other. In such an embodiment, the server application 132 can push notifications to the corresponding user devices 110 and 150 based on the data from the location monitoring service.

As used herein, presented data stores 115, 135, and 155 can be a physical or virtual storage space configured to store digital information. Data stores 115, 135, and 155 can be physically implemented within any type of hardware including, but not limited to, a magnetic disk, an optical disk, a semiconductor memory, a digitally encoded plastic memory, a holographic memory, or any other recording medium. Data stores 115, 135, and 155 can be a stand-alone storage unit as well as a storage unit formed from a plurality of physical devices. Additionally, information can be stored within data stores 115, 135, and 155 in a variety of manners. For example, information can be stored within a database structure or can be stored within one or more files of a file storage system, where each file may or may not be indexed for information searching purposes. Further, data stores 115, 135, and/or 155 can utilize one or more encryption mechanisms to protect stored information from unauthorized access.

Figure 2:
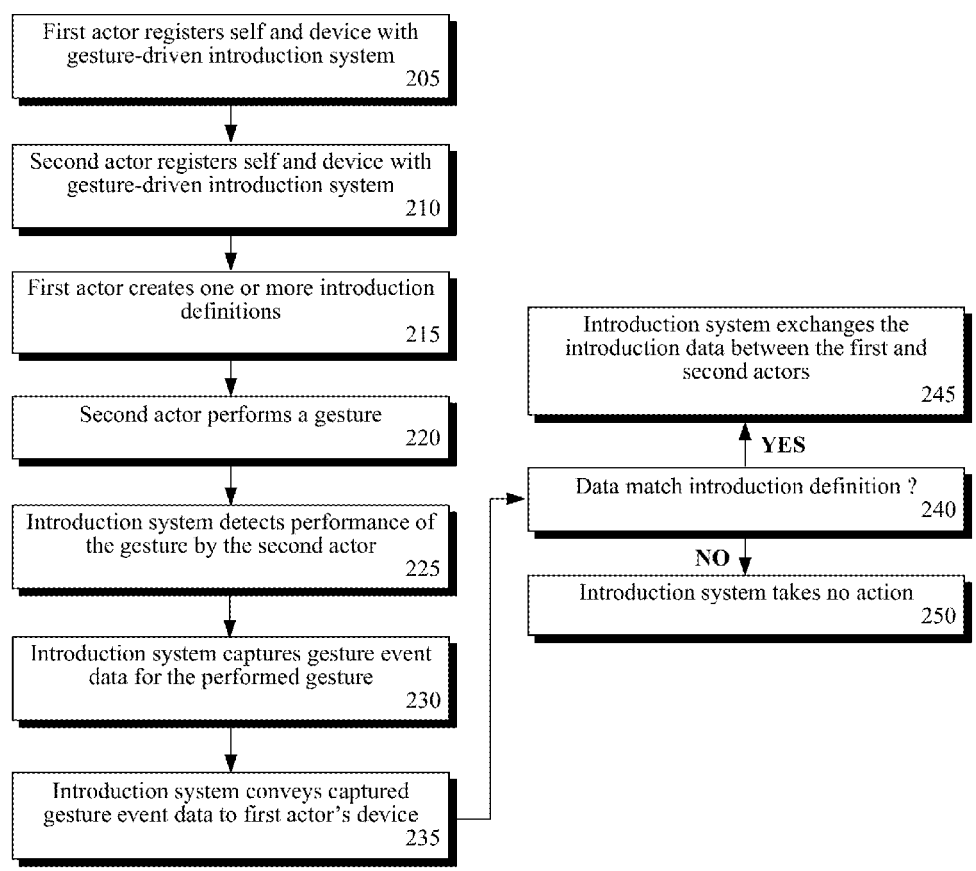
FIG. 2 is a flowchart of a method describing the general use of the gesture-driven introduction system in accordance with embodiments of the inventive arrangements disclosed herein.

Network 165 can include any hardware/software/and firmware necessary to convey data encoded within carrier waves. Data can be contained within analog or digital signals and conveyed though data or voice channels. Network 165 can include local components and data pathways necessary for communications to be exchanged among computing device components and between integrated device components and peripheral devices. Network 165 can also include network equipment, such as routers, data lines, hubs, and intermediary servers which together form a data network, such as the Internet. Network 165 can also include circuit-based communication components and mobile communication components, such as telephony switches, modems, cellular communication towers, and the like. Network 165 can include line based and/or wireless communication pathways FIG. 2 is a flowchart of a method 200 describing the general use of the gesture-driven introduction system in accordance with embodiments of the inventive arrangements disclosed herein. Method 200 can be performed within the context of system 100.

Method 200 can begin with step 205 where the first actor registers their self and their device with the introduction system. A second actor can register their self and device with the introduction system in step 210. Steps 205 and 210 can be executed simultaneously or in reverse order.

In step 215, the first actor can create one or more introduction definitions. The second actor can perform a gesture supported by the introduction system in step 220. It can be important to note that step 215 can require the second actor to be in a location associated with the introduction system. Embodiments exist where time (among other parameters) is used as a criterion instead of and/or in addition to location. For example, two actors watching a common event from different locations (one parameter can be event viewing) can be introduced per the disclosure in response to a gesture by one of the actors. The gesture can, for example, indicate an agreement with a posted comment, a facial gesture, or other such similarity having a nexus with the event, which the two actors are concurrently experiencing. Introduction definitions of the first actor can define circumstances under which an introduction is permitted and/or preferred. In embodiments, introductions may be based on a single profile and corresponding introduction definitions, may be based on two or more profiles/introduction definitions (of those registered with the introduction system), and/or may be based on a combination of introduction definitions/profiles/heuristics/rules/and situation specific parameters.

In step 225, the introduction system can detect the performance of the gesture by the second actor. The introduction system can capture gesture event data for the performed gesture in step 230. In step 235, the introduction system can covey the captured gesture event data to the user device of the first actor.

It can be determined if the gesture event data matches the triggering parameters of an introduction definition in step 240. When the gesture event data matches an introduction definition, step 245 can be performed where the introduction system can exchange the introduction data between the first and second actors. When the gesture event data does not match an introduction definition, the introduction system can take no further action in step 250. The above use case assumes that an introduction is based on the first actor's introduction definition and the second actor's gesture (triggering an introduction per the first actor's introduction definition). In one embodiment, the second actor can also create an introduction definition, where a combination of the definitions defines whether an introduction between the first and second actors occurs per a gesture. In one embodiment, introduction definitions can include parameters or conditions for receiving an introduction as well as disparate parameters for conveying an introduction. An arbitrary complexity of constraints, rules, and filters may apply to introductions. In complex systems, scores reflecting a desirability can be computed for the first and/or second actor, which are compared against thresholds, which can vary based on a situational concerns, such as how busy one or the other actors is and/or how resistant/receptive one actor is to new introductions at a given point in time. It should be noted that the steps of method 200 can apply to more than just two actors. That is, the introduction system can have many members (actors) and data exchanges can occur on a one-to-many basis as well as one-to-one. Consequently, introductions consistent with the disclosure can apply between two individuals, between three or more individuals lacking a pre-existing affinity between each other, between one individual and a defined group, between two groups, and the like. In some implementations, different gestures can be defined to indicate whether a one-to-one introduction, a one-to-many, or a one-to-group introduction is desired by an instruction triggering actor.

Figure 3:
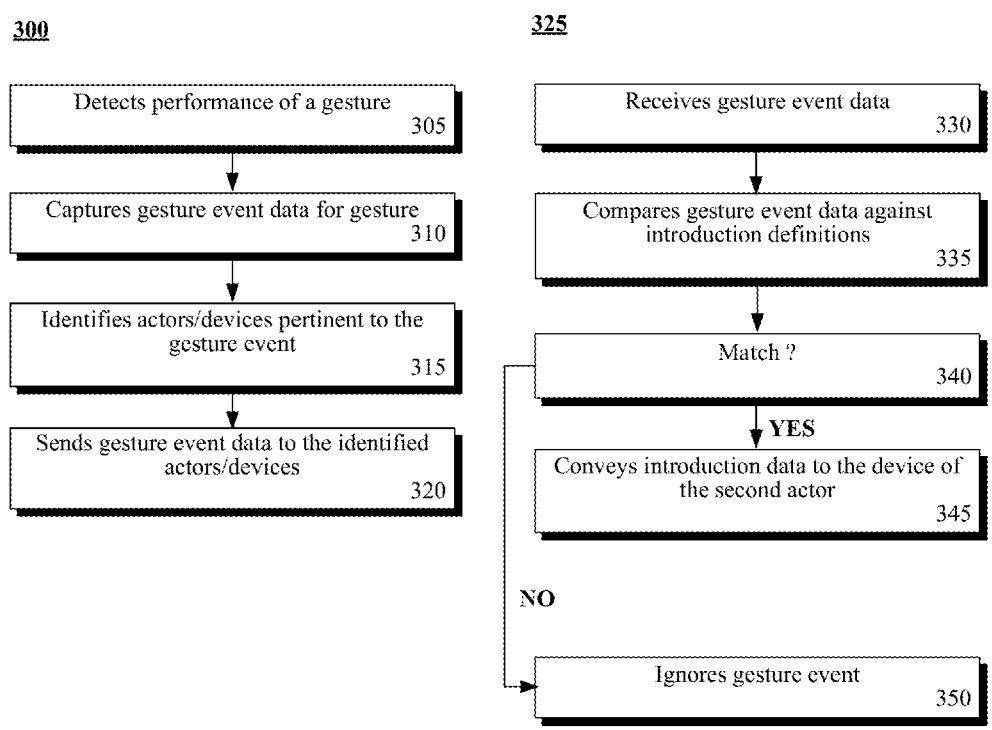
FIG. 3 is a flowchart of a methods that detail operation of the introduction system from the server and client perspectives in accordance with embodiments of the inventive arrangements disclosed herein.

FIG. 3 is a flowchart of a methods 300 and 325 that detail operation of the introduction system from the server and client perspectives in accordance with embodiments of the inventive arrangements disclosed herein. Methods 300 and 325 can be performed within the context of system 100 and/or method 200.

Method 300 can be from the server perspective and can begin with step 305 where the performance of a gesture can be detected. Gesture event data for the detected gesture can be captured in step 310.

In step 315, the actors and/or user devices that are pertinent to the gesture event can be identified. That is, the introduction system can determine which members would be interested in the performed gesture. Depending on the specific implementation of the introduction system, step 315 can be performed in various ways.

For example, the introduction system can support member-created events. The parameters defining the member-created events the event can help the introduction system to identify other interested members (i.e., other members whose user devices are located at the event location).

Alternately, the introduction system can compare the gesture event data with member profiles to determine which members may be interested. This approach, however, can be slower and less accurate.

Method 325 can be from the client application perspective on the user device of the first actor and can begin with step 330 where gesture event data is received. The received gesture event data can be compared against the triggering parameters of the actor's introduction definitions in step 335.

In step 340, it can be determined if the received gesture event data matches the triggering parameters of any of the introduction definitions. When the gesture event data does not match an introduction definition, the gesture event data can be ignored in step 350. When the gesture event data does match an introduction definition, step 345 can be performed where the introduction data associated with the matched introduction definition can be conveyed to the user device of the second actor.

In another embodiment, step 345 can be expanded upon to allow the first and second actors the option to authorize or reject the exchange of introduction data, instead of an automatic exchange. Such an embodiment can allow the actors an additional level of control for exchanging introduction data.

Figure 4:
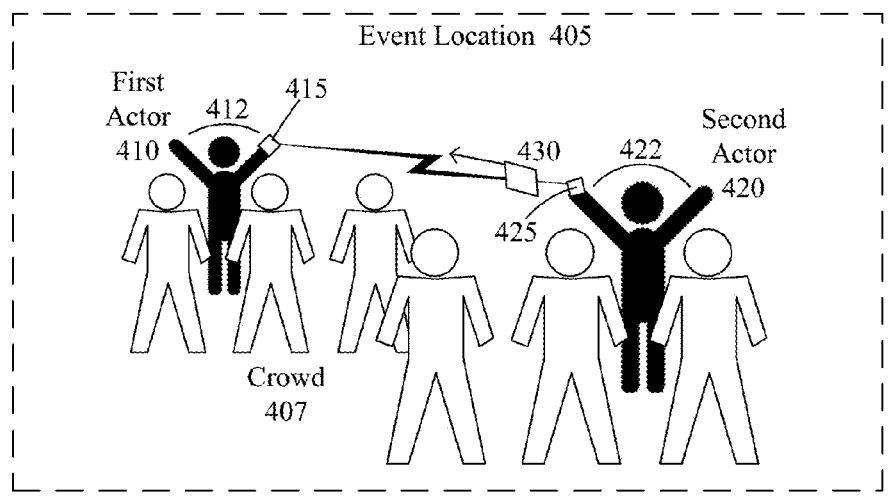
FIG. 4 is a collection of example illustrations 400 and 435 that graphically depict use of the introduction system in accordance with embodiments of the inventive arrangements disclosed herein.
Figure 4:
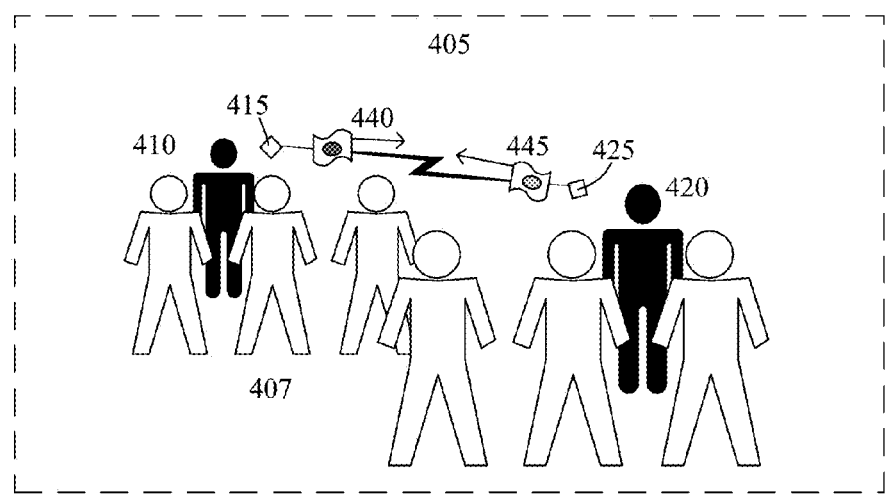

FIG. 4 is a collection of example illustrations 400 and 435 that graphically depict use of the introduction system in accordance with embodiments of the inventive arrangements disclosed herein. Example illustrations 400 and 435 can utilize the concepts taught in system 100 and methods 200, 300, and 325.

Example illustrations 400 and 435 can both be set in the same event location 405 having a crowd 407 of people. For discussion purposes, the event location can be a sports bar and the crowd 407 can be the bar patrons. The first actor 410 can be a patron 405 who is a fan of an out-of-state sports team and would like to meet other fans of the same team.

The first actor 410 can use the introduction system to create an introduction definition to exchange introduction data with other fans of the out-of-state team by putting their arms up when their team scores during the next game. Additionally, if the introduction system supports user-created events, the first actor 410 can advertise or broadcast the location of the sports bar 405.

The second actor 420 can also be a member of the introduction system and a fan of the same out-of-state sports team. The second actor 420 can be made aware of the first actor's 410 location or event as well as the gesture 422 that must be performed to trigger a data exchange.

In example 400, the first actor 410 and the second actor 420 can both be in the sports bar 405. During the game, both actors 410 and 420 can perform the gesture 412 and 422, putting their arms in the air when their team scores. The first actor 410 need not have any physical, visual, or verbal interaction with the second actor 420. This lack of direct interaction can be of benefit to those individuals that have challenges and/or difficulties in social situations.

For example, a person with social anxiety can have serious difficulty interacting with new people. The introduction system can provide such a person with a framework that mitigates their anxiety while allowing them to increase their social circle.

The user device 425 of the second actor 420 can capture and send gesture event data 430 to the user device 415 of the first actor 410. It should be noted that transmission of the gesture event data can also be routed through a server of the introduction system.

In example illustration 435, both actors 410 and 420 can continue viewing the game in the sports bar 405 without interacting while introduction data 440 and 445 is exchanged by their user devices 415 and 425. Example 435 can assume that the user device 415 of the first actor 410 has determined that the received gesture event data matches their introduction definition.

It should also be noted that the introduction system can allow for introduction data 440 and 445 to be exchanged even when the second actor 420 is not proximate to the first actor 410. For example, the second actor 420 could be watching the game in their home and perform the gesture 422. The gesture event data 430 can be sent to the introduction system. The introduction system can then forward the gesture event data 430 to the user device 415 of the first actor 410.

Figure 5:
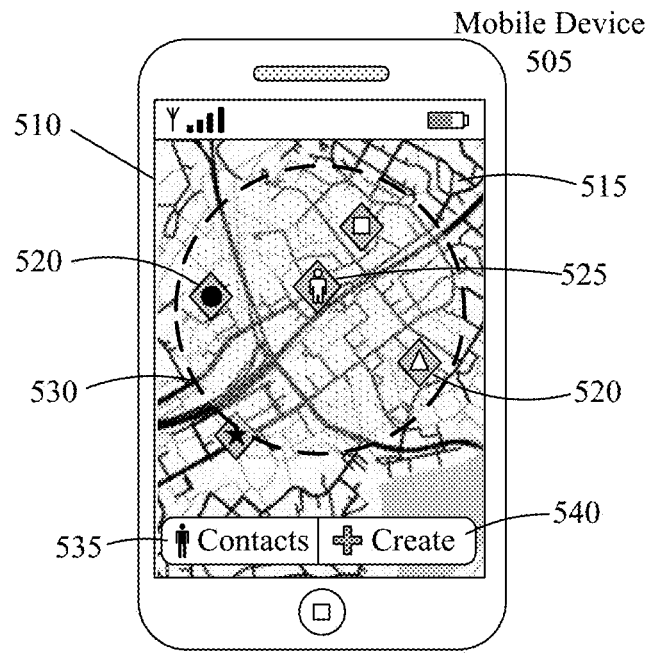
FIG. 5 depicts example user interface views for the introduction system in accordance with embodiments of the inventive arrangements disclosed herein.
Figure 5:
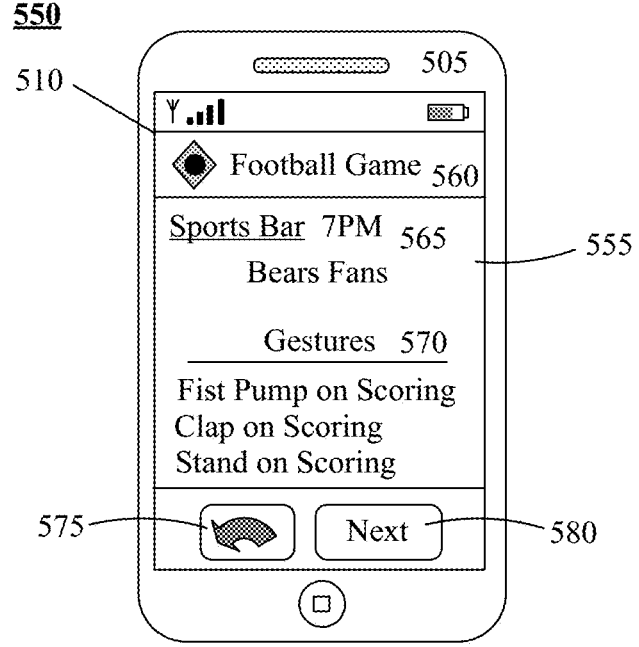

FIG. 5 depicts example user interface views 500 and 550 for the introduction system in accordance with embodiments of the inventive arrangements disclosed herein. The example user interface views 500 and 550 can be for the client application of the introduction system.

Both example user interface views 500 and 550 can be presented within the display 510 of the mobile device 505. The mobile device 505 of these examples 500 and 550 can have a touch display 510 that allows user input.

Example 500 can show a map view 515 presented to a member upon authentication to the introduction system. The map view 515 can be a road/street map or a physical map that is centered on the member's location, which can be indicated by a member icon 525.

A dashed circle centered on the member icon 525 can indicate a radial limit 530 for presenting active (i.e., current or upcoming) events for the introduction system. These events can be indicated in the map view 515 by a variety of icons 520. Additional information about the events like distance away can be graphically or textually presented near the icons 520.

Actions that the member can perform in the map view 515 can be presented as well as implied by the user interface. In this example 500, the map view 515 can present a contacts button 535 and a create button 540; implied actions can be those common to a touch-screen 510 user interface like tapping an icon 520 to select it or dragging the map to view a different area.

The contacts button 535 can present the member with a list of introduction system members with whom they have exchanged introduction data. The create button 540 can present the member with options for creating an event or introduction definition.

Selecting the black circle icon 520 from the map view 515 can present the member with an event view 555 as shown in example user interface 550. In this user interface 550, the member can be presented with the information that was specified for the selected event. The event view 555 can present the member with the name of the event 560, the time, date, location, and/or theme of the event 565, the gestures 570 for exchanging data at the event, a back button 575, and a next button 580.

The back and next buttons 575 and 580 can provide navigation functionality within the user interface 550. The back button 580 can return the member to the map view 515 or list view, whereas the next button 575 can present the event view 555 for the next event.

Figure 6:
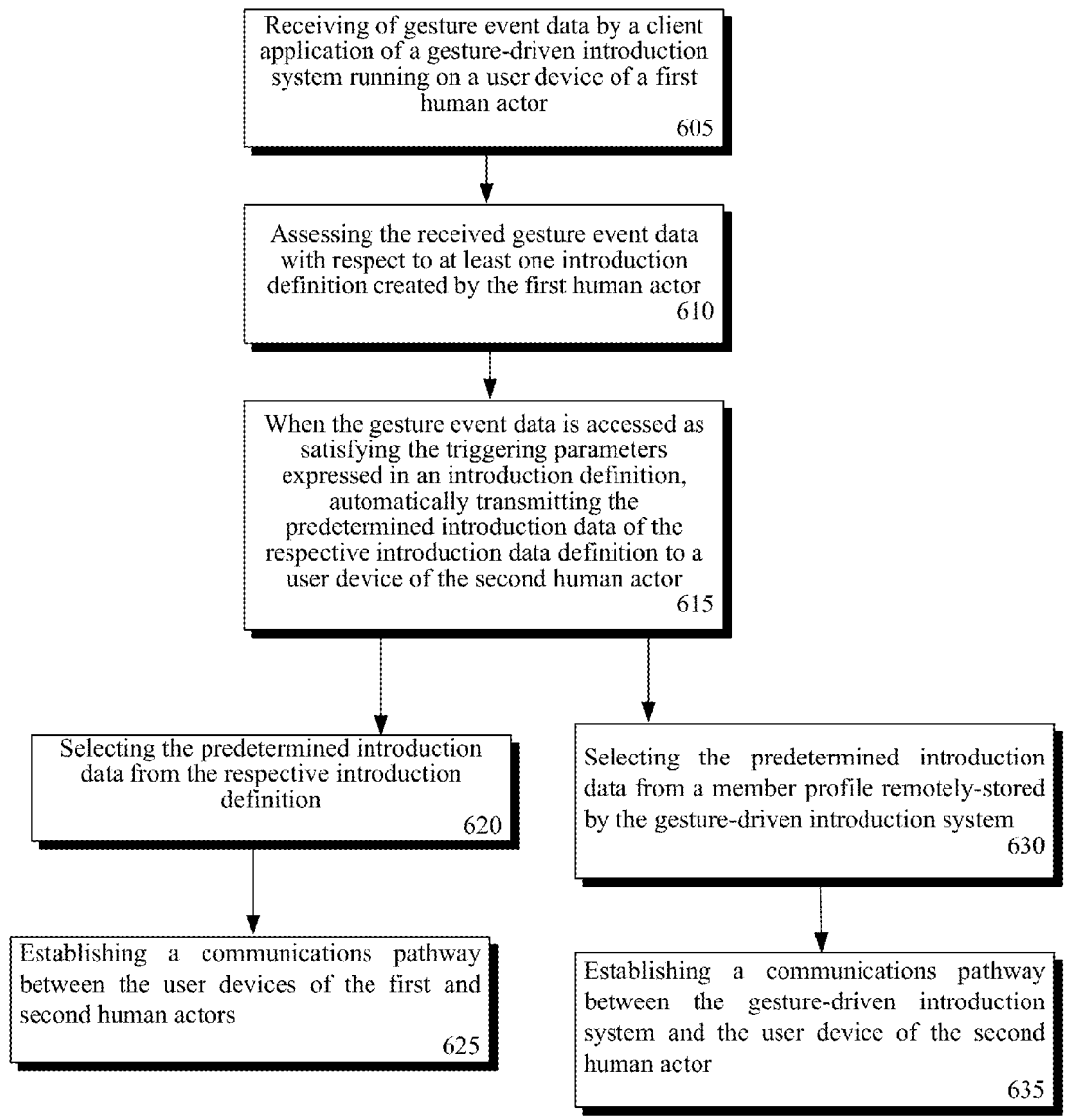
FIG. 6 is a flowchart of a method for receiving, assessing, and transmitting gesture event data in accordance with an embodiment of the disclosure.

FIG. 6 is a flowchart of a method in accordance with an embodiment of the disclosure. In step 605, Gesture event data is received by a client application of a gesture-driven introduction system running on a user device of a first human actor. The gesture event data includes a gesture and at least one ancillary condition regarding performance of the gesture by a second human actor. The gesture is representative of a discrete non-empty set of deliberate motions whose execution utilizes at least one visible and movable body part of the second human actor. The first human actor and the second human actor are registered members of the gesture-driven introduction system. In step 610, the received gesture event data is assessed with respect to at least one introduction definition created by the first human actor. An introduction definition defines triggering parameters for exchanging predetermined introduction data. The triggering parameters comprise at least one gesture and at least one ancillary condition. In step 615, when the gesture event data is assessed as satisfying the triggering parameters expressed in an introduction definition, the predetermined introduction data of the respective introduction definition is automatically transmitting to a user device of the second human actor. The transmission occurs without direct physical or verbal interaction between the first and second human actors. In one embodiment, the gesture event data received by the user device of the first human actor was previously-captured by and conveyed from one of the gesture-driven introduction system and the user device of the second human actor. In one embodiment, the ancillary condition includes a time for performing the gesture, a location where the gesture is performed, a date for performing the gesture, a proximity between the first and second human actors, physical characteristics of the second human actor, characteristics of an appearance of the second human actor, and personal data provided by the second human actor to the gesture-driven introduction system. In one embodiment, the user device is one of a smartphone, a tablet computer, a notebook computer, a fitness tracking device, a smart watch, a portable gaming system, a pair of smart glasses, and a personal computing device having a transceiver for communicating with the gesture-driven introduction system and having a sensor for sensing an occurrence of one or more user gestures. In one embodiment, transmission of the predetermined introduction data utilizes one of a BLUETOOTH communications network, a near-field communications network, a wireless communications network, and a cellular communications network, wherein a selection of the communications network to utilize is based upon a proximity and capability of the first and second human actors' respective user devices.

In one embodiment transmitting the predetermined introduction data includes selecting the predetermined introduction data from the respective introduction definition, as shown by step 620. The introduction definitions is stored local to the user device of the first human actor. As shown by step 625, a communications pathway is established between the user devices of the first and second human actors. Transmission of the selected introduction data is performed using the established communications pathway.

In one embodiment, transmitting the predetermined introduction data includes selecting the predetermined introduction data from a member profile remotely-stored by the gesture-driven introduction system, as shown by step 625. The predetermined introduction data is a subset of the member profile. The member profile is defined by the first human actor during registration with the gesture-driven introduction system. As shown by step 630, a communications pathway is established between the gesture-driven introduction system and the user device of the second human actor. Transmission of the selected introduction data is performed using the established communications pathway.

In one embodiment, the receiving, assessing, and transmitting steps (steps 605, 610, and 615, respectively) are simultaneously performed with the roles of the first and second human actors transposed. An end result is transmission of the first human actor's introduction data to the second human actor and the second human actor's introduction data to the first human actor.

Figure 7:
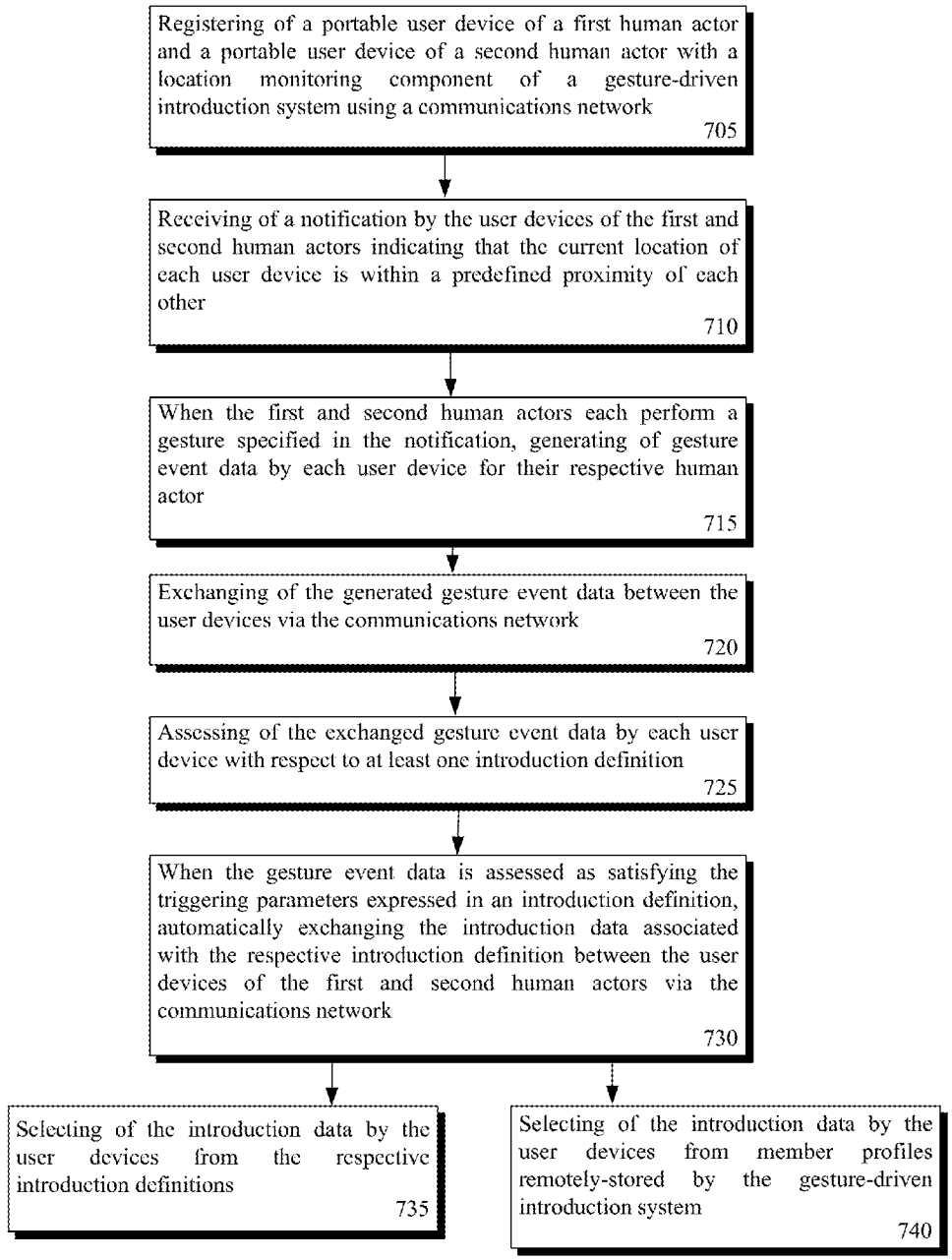
FIG. 7 is a flowchart of a method for registering a portable user device, receiving a notification, and generating, assessing, and transmitting gesture event data in accordance with an embodiment of the disclosure.

FIG. 7 is a flowchart of a method in accordance with an embodiment of the disclosure. In step 705, a portable user device of a first human actor and a portable user device of a second human actor are registered with a location monitoring component of a gesture-driven introduction system using a communications network. The first human actor and the second human actor are members of the gesture-driven introduction system. The registration notifies the location monitoring component of a current location of each user device. In step 710, a notification is received by the user devices of the first and second human actors indicating that the current location of each user device is within a predefined proximity of each other. The notification is made via a client application running on their respective user devices and specifies at least one gesture to perform to exchange introduction data. The gesture is representative of a discrete non-empty set of deliberate motions whose execution utilizes at least one visible and movable body part. In step 715, when the first and second human actors each perform a gesture specified in the notification, gesture event data is generated by each user device for their respective human actor. The gesture event data includes the gesture and at least one ancillary condition regarding performance of the gesture. In step 720, the generated gesture event data is exchanged between the user devices via the communications network. In step 725, the exchanged gesture event data is assessed by each user device with respect to at least one introduction definition. An introduction definition is a user-created data structure that defines triggering parameters for exchanging introduction data. The triggering parameters include at least one gesture and at least one ancillary condition. In step 730, when the gesture event data is assessed as satisfying the triggering parameters expressed in an introduction definition, the introduction data associated with the respective introduction definition is automatically exchanged between the user devices of the first and second human actors via the communications network. The exchange occurs without direct physical or verbal interaction between the first and second human actors.

In one embodiment, the exchanging the introduction data includes a selecting of the introduction data by the user devices from the respective introduction definitions, as shown by step 735. The introduction definitions are stored local to each respective user device or are stored in a data store local to servers of the gesture-driven introduction system.

In one embodiment, the exchanging the introduction data includes a selecting of the introduction data by the user devices from member profiles remotely-stored by the gesture-driven introduction system. The introduction data is a subset of each respective member profile. The member profiles are defined by the first and second human actors during registration with the gesture-driven introduction system.

In one embodiment, the communications network used for the exchanging of the gesture event data and the introduction data utilizes one of BLUETOOTH technology, near-field technology, wireless communications technology, and cellular communications technology. A selection of the communications network to utilize for each exchange is based upon a proximity and capability of the first and second human actors' respective user devices. In one embodiment, each user device is one of a smartphone, a tablet computer, a notebook computer, a fitness tracking device, a smart watch, a portable gaming system, a pair of smart glasses, and a personal computing device having a transceiver for communicating with the gesture-driven introduction system and having a sensor for sensing an occurrence of one or more user gestures.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving of gesture event data by a client application of a gesture-driven introduction system running on a user device of a first human actor, wherein the gesture event data comprises a gesture and at least one ancillary condition regarding performance of the gesture by a second human actor, wherein the gesture is representative of a discrete non-empty set of deliberate motions whose execution utilizes at least one visible and movable body part of the second human actor, wherein the first human actor and the second human actor are registered members of the gesture-driven introduction system;
   assessing the received gesture event data with respect to at least one introduction definition created by the first human actor, wherein an introduction definition defines triggering parameters for exchanging predetermined introduction data, wherein the triggering parameters comprise at least one gesture and at least one ancillary condition; and
   when the gesture event data is assessed as satisfying the triggering parameters expressed in an introduction definition, automatically transmitting the predetermined introduction data of the respective introduction definition to a user device of the second human actor, wherein said transmission occurs without direct physical or verbal interaction between the first and second human actors.

2. The method of claim 1, wherein the gesture event data received by the user device of the first human actor was previously-captured by and conveyed from one of the gesture-driven introduction system and the user device of the second human actor.

3. The method of claim 1, wherein the at least one ancillary condition comprises a time for performing the gesture, a location where the gesture is performed, a date for performing the gesture, a proximity between the first and second human actors, physical characteristics of the second human actor, characteristics of an appearance of the second human actor, and personal data provided by the second human actor to the gesture-driven introduction system.

4. The method of claim 1, wherein the user device is one of a smartphone, a tablet computer, a notebook computer, a fitness tracking device, a smart watch, a portable gaming system, a pair of smart glasses, and a personal computing device having a transceiver for communicating with the gesture-driven introduction system and having a sensor for sensing an occurrence of one or more user gestures.

5. The method of claim 1, wherein transmission of the predetermined introduction data utilizes one of a BLUETOOTH communications network, a near-field communications network, a wireless communications network, and a cellular communications network, wherein a selection of the communications network to utilize is based upon a proximity and capability of the first and second human actors' respective user devices.

6. The method of claim 1, wherein transmitting the predetermined introduction data further comprises:
   selecting the predetermined introduction data from the respective introduction definition, wherein the introduction definitions is stored local to the user device of the first human actor; and
   establishing a communications pathway between the user devices of the first and second human actors, wherein transmission of the selected introduction data is performed using the established communications pathway.

7. The method of claim 1, wherein transmitting the predetermined introduction data further comprises:
   selecting the predetermined introduction data from a member profile remotely-stored by the gesture-driven introduction system, wherein the predetermined introduction data is a subset of the member profile, wherein the member profile is defined by the first human actor during registration with the gesture-driven introduction system; and
   establishing a communications pathway between the gesture-driven introduction system and the user device of the second human actor, wherein transmission of the selected introduction data is performed using the established communications pathway.

8. The method of claim 1, wherein the receiving, assessing, and transmitting steps are simultaneously performed with the roles of the first and second human actors transposed, wherein an end result is transmission of the first human actor's introduction data to the second human actor and the second human actor's introduction data to the first human actor.

9. A method comprising:
   registering of a portable user device of a first human actor and a portable user device of a second human actor with a location monitoring component of a gesture-driven introduction system using a communications network, wherein the first human actor and the second human actor are members of the gesture-driven introduction system, wherein said registration notifies the location monitoring component of a current location of each user device; and receiving of a notification by the user devices of the first and second human actors indicating that the current location of each user device is within a predefined proximity of each other, wherein said notification is made via a client application running on their respective user devices and specifies at least one gesture to perform to exchange introduction data, wherein the gesture is representative of a discrete non-empty set of deliberate motions whose execution utilizes at least one visible and movable body part;

when the first and second human actors each perform a gesture specified in the notification, generating of gesture event data by each user device for their respective human actor, wherein the gesture event data comprises the gesture and at least one ancillary condition regarding performance of the gesture;

exchanging of the generated gesture event data between the user devices via the communications network;

assessing of the exchanged gesture event data by each user device with respect to at least one introduction definition, wherein an introduction definition is a user-created data structure that defines triggering parameters for exchanging introduction data, wherein the triggering parameters comprise at least one gesture and at least one ancillary condition; and when the gesture event data is assessed as satisfying the triggering parameters expressed in an introduction definition, automatically exchanging the introduction data associated with the respective introduction definition between the user devices of the first and second human actors via the communications network, wherein said exchanging of the generated gesture event data occurs without direct physical or verbal interaction between the first and second human actors.

10. The method of claim 9, wherein exchanging the introduction data further comprises:
selecting of the introduction data by the user devices from the respective introduction definitions, wherein the introduction definitions are stored local to each respective user device or are stored in a data store local to servers of the gesture-driven introduction system.

11. The method of claim 9, wherein exchanging the introduction data further comprises:
selecting of the introduction data by the user devices from member profiles remotely-stored by the gesture-driven introduction system, wherein the introduction data is a subset of each respective member profile, wherein the member profiles are defined by the first and second human actors during registration with the gesture-driven introduction system.

12. The method of claim 9, wherein the communications network used for the exchanging of the gesture event data and the introduction data utilizes one of BLUETOOTH technology, near-field technology, wireless communications technology, and cellular communications technology, wherein a selection of the communications network to utilize for the exchanging of the generated gesture event data is based upon a proximity and capability of the first and second human actors' respective user devices.

13. The method of claim 9, wherein each user device is one of a smartphone, a tablet computer, a notebook computer, a fitness tracking device, a smart watch, a portable gaming system, a pair of smart glasses, and a personal computing device having a transceiver for communicating with the gesture-driven introduction system and having a sensor for sensing an occurrence of one or more user gestures.

14. A gesture-driven introduction system comprising:
a plurality of gestures defined within a gesture-driven introduction system, wherein each gesture represents a discrete non-empty set of deliberate motions whose execution utilizes at least one visible and movable body part of a human actor;
a plurality of user-created introduction definitions comprising triggering parameters for exchanging introduction data;
a set of gesture capture components, comprising at least one camera, one or more input output component, or elements of a data capture system that provides video or audio feeds, or combinations thereof, for capturing gesture event data when a human actor performs one of the plurality of gestures, wherein the gesture event data comprises the gesture and at least one ancillary condition regarding performance of the gesture;
an application, comprising a software program that runs on hardware of a server of the gesture-driven introduction system, for determining when captured gesture event data satisfies the triggering parameters of one of the plurality of user-created introduction definitions; and
hardware and software of the gesture-driven introduction system for exchanging the introduction data over a communications network between user devices of two or more members of the gesture-driven introduction system responsive to satisfaction of the one of the plurality of introduction definitions.

15. The system of claim 14, wherein the set of gesture capture components utilize at least one component of an electronic device accessible by the gesture-driven introduction system and separate from the user devices of members of the gesture-driven introduction system, wherein said at least one component comprises one of an accelerometer, a gyroscope, a rotational vector sensor, a gravity sensor, a photometer, an orientation sensor, a magnetometer, and a digital video camera, wherein the at least one component includes supporting software.

16. The system of claim 14, wherein the set of gestures components utilizes at least one component inherent to a user device of a member of the gesture-driven introduction system, wherein said at least one component comprises one of an accelerometer, a gyroscope, a rotational vector sensor, a gravity sensor, a photometer, an orientation sensor, a magnetometer, and a digital video camera, wherein the at least one component includes supporting software.

17. The system of claim 14, further comprising:
a data store, which includes hardware to store non-transitory digital information, for storing the plurality of gestures and member data for human actors registered with the gesture-driven introduction system and their respective user devices.

18. The system of claim 14, wherein the plurality of user-created introduction definitions are stored local to a user device of a member of the gesture-driven introduction system, wherein the application comprises a client software application running on a user device of a member of the gesture-driven introduction system.

19. The system of claim 14, wherein the plurality of user-created introduction definitions are stored local to a server of the gesture-driven introduction system or are stored in a data store of the user devices, wherein the application comprises a software application running on said server or running on one of the user devices.

20. The system of claim 14, further comprising:
a plurality of gesture samples for each member of the gesture-driven introduction system, wherein said plurality of gesture samples are stored as member data for each member, wherein a gesture sample represents an exemplar of a member performing one of the plurality of gestures, wherein the plurality of gesture samples is captured using the set of gestures components.

* * * * *